June 24, 1930.   A. MARŠIK   1,768,208
CIRCUIT CLOSER TO INDICATE TURNS OF A VEHICLE
Filed March 21, 1928

Augustin Maršik, Inventor,
By Byrnes Townsend & Brickenstein,
Attorneys.

Patented June 24, 1930

1,768,208

UNITED STATES PATENT OFFICE

AUGUSTIN MARŠÍK, OF PRAGUE, CZECHOSLOVAKIA, ASSIGNOR TO CESKOMORAVSKA-KOLBEN-DANEK AKCIOVA SPOLECNOST, OF PRAGUE, CZECHOSLOVAKIA, A CORPORATION OF CZECHOSLOVAKIA

CIRCUIT CLOSER TO INDICATE TURNS OF A VEHICLE

Application filed March 21, 1928, Serial No. 263,423, and in Czechoslovakia April 1, 1927.

The present invention relates to direction indicators for use on vehicles and constitutes a modification of the invention forming the subject matter of my co-pending application Ser. No. 263,422.

The subject of the invention according to the said co-pending application is an arrangement for direction indicators on vehicles by means of which after the vehicle has executed a turning movement, a signal which had been adjusted on the indicator before the beginning of the said turning movement and which indicates the direction of the turning movement, is automatically altered to a signal indicating a course straight ahead. In the said co-pending application amongst other things, a device is described in which one part (a movable stop) of the control lever of the switch is guided by means of a guide of novel form, both during the movement by means of which the signal indicating the turning of the vehicle is set as also during the movement by means of which this signal is altered to a signal indicating a course straight ahead, in such manner that the said part or stop during its rotation about the axis of the switch and in addition to the rotation about this axis also moves in another direction, for example in the direction of this axis.

In the further development of the invention according to the said co-pending application it was found that it is not absolutely necessary that for the attainment of the above mentioned effect, a part (a movable stop) of the lever of the switch should during its rotation about the switch axis necessarily be moved in the direction of this axis, but that the same effect could be obtained by guiding the part (the movable stop) of the lever by means of a guide of novel type in such manner that during its rotation about the axis of the switch it also executes another movement in its plane of rotation, for instance radially to the axis of the switch.

Figure 1:
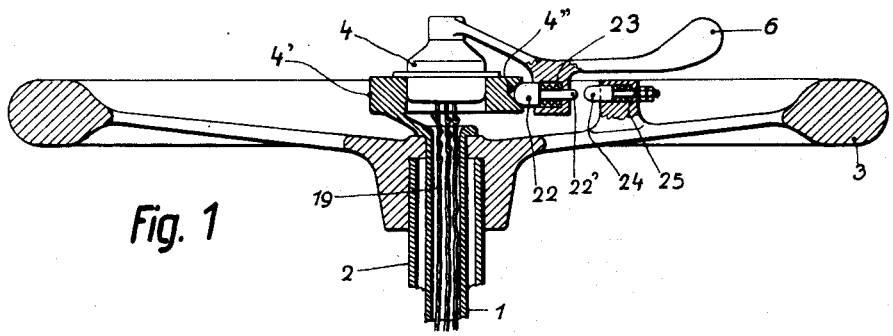
Figure 2:
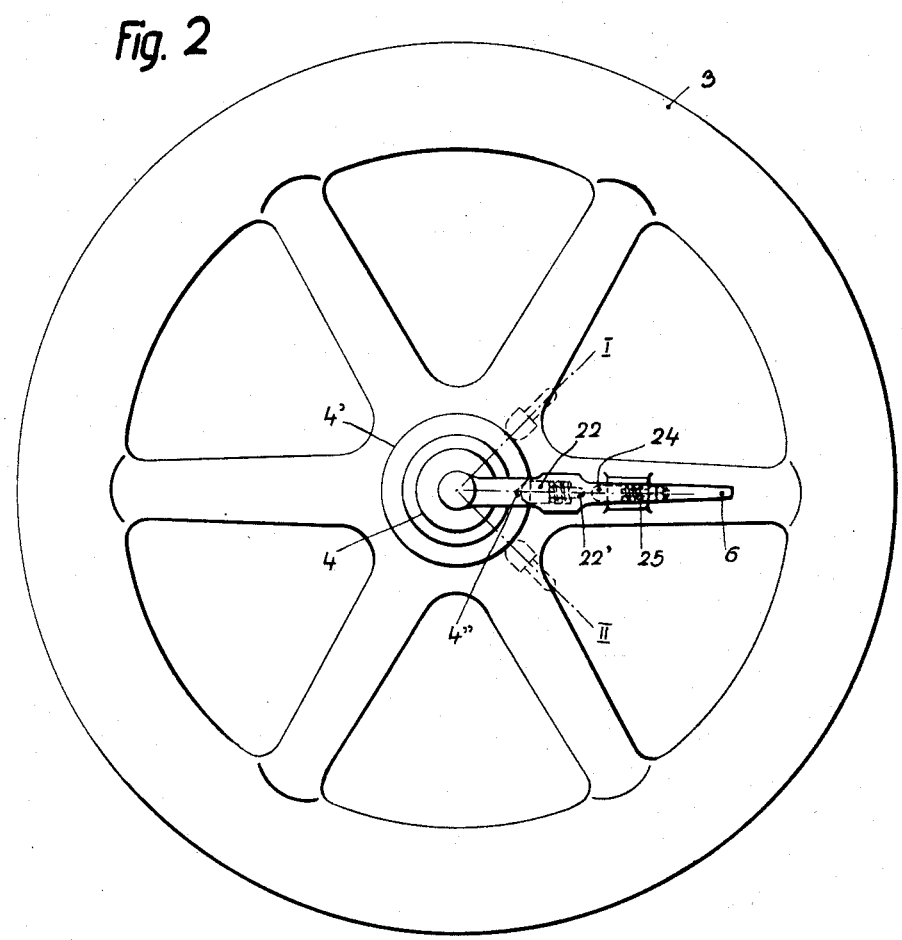

A constructional form of such modification according to the invention is illustrated by way of example in Figs. 1 and 2 of the drawing, in which:

Fig. 1 is a sectional elevation and
Fig. 2 shows a plan view, with the steering wheel partly broken away, and the principal positions of the switch lever indicated. In the drawings parts of the device corresponding to similar parts of the device according to the said co-pending application have been denoted by the same reference numerals.

1 is a fixed column arranged within the shaft 2 of the steering wheel 3. On the column 1, the casing 4 of a switch is fixed the construction of which corresponds to that of known electrical lamp switch. This switch is provided with contacts which are operated by the rotation of a hand lever 6. By turning this latter out of its middle position (in which the current is switched off) by an angle of about 45° to the one side or the other, either the head lamps or the spot lamps of the vehicle are put into circuit. If a direction indicator is connected to this switch, then instead of the lamps being switched into circuit the signals on the indicator for a turn of the vehicle to the right or to the left will be actuated, the indication for a course straight ahead of the vehicle being given when the current is switched off. The leads 19 for the switch are passed through the interior of the steering wheel shaft.

The aforementioned guide of a part (a movable stop) of the control lever 6 of the switch is constructed in the form of a cylinder 4' which is provided at the place corresponding to the middle position of the lever 6, that is to say the position for driving straight ahead, with a recess or incision 4''. In the lever 6 a slidable stop 22 is provided the left hand end of which is held pressed in the middle position of the lever 6 into the recess 4'' by means of a spring 23. On the steering wheel 3 a stop 24 is provided which is likewise slidable and which is kept pressed towards the outer end 22' of the stop 22 by means of a spring 25, the arrangement being however such that a small play is left between the two stops, which play can be regulated by means of nuts on the stop 24.

When it is desired to indicate on the indicator the direction of the intended turn of the vehicle the lever 6 is turned correspondingly into one of the end positions I or II (Fig. 2) whereby the corresponding contacts of the switch 4 are closed. On turning the lever out of its middle position the stop 22 first passes out of the recess 4″ against the action of the spring 23 and passes on to the cylindrical part 4′ of the guide so that the stop 22 approaches the path of the stop 24 by an extent equal to the length of the part which was previously engaged with the recess 4″ and which is greater than the aforementioned play between the stops 22, 22′ and 24. If, for the purpose of turning the vehicle the steering wheel 3 is turned, then the stop 24 of the latter strikes against the end 22′ of the stop 22. The lever 6 is secured against further movement beyond the extreme position I or II and therefore, since radial movement of the stop 22 is prevented by the guide 4′, the stop 24 will be temporarily pushed back against the action of the powerful spring 25 until it passes over the stop 22 and the steering wheel 3 can be turned as desired. On the return movement of the steering wheel into the middle position, that is for a course of the vehicle straight ahead, the stop 24 again strikes against the stop 22, 22′; since, however, the power of the spring 25 is so calculated that the latter offers a greater resistance to being compressed than the lever 6 and the stop 22, 22′ offer to their return to the middle position, the stop 24 therefore presses the stop 22, 22′ and consequently also the lever 6 back into the middle position, in which the lefthand end of the stop 22 passes into the recess 4″ under the action of the spring 23 and in this manner the aforementioned small play is once more established between the stops 22, 22′ and 24.

It is, however, easily possible to arrange the whole device, i. e. for example the lever 6 and the stops 22 and 24 in a common casing in any desired position on the vehicle, for instance, on a wall or the like, so that it is separated from the steering wheel. It is only necessary that the relative position and the relative movements of the stops 22 and 24 in similar manner to that described in detail in connection with the embodiment shown in the drawing, should be adhered to. In this case the stop or a part on which the stop is mounted is actuated in suitable manner by any suitable movable part serving for the steering of the vehicle. For instance, the stop 24 may be mounted on a belt or rope pulley or the like which is mounted concentrically with the axis of rotation of the lever 6 and is driven by means of a belt, rope or the like from a similar pulley fixed on the steering wheel shaft.

While the form of mechanism herein shown and described is well adapted to fulfill the object of the invention, it is to be understood that it is not intended to confine the invention to the form of embodiment herein disclosed, for it is susceptible of embodiment in various further forms all coming within the scope of the claims which follow.

I claim:

1. In a signaling switch for direction indicators of a vehicle, in combination, a steering wheel, a switch lever adapted for movement from a neutral position to positions indicating a right or a left turn, a stop on said lever, a cooperating stop mounted for movement with the steering wheel of said vehicle, said stops being radially in alignment but separated when said lever is in neutral position and said steering wheel in position to steer the vehicle in a straight path, and guide means for moving said stop on the lever radially into the path of movement of the steering wheel stop when said lever is moved to indicate a turn.

2. The structure as in claim 1 characterized by the fact that said stop mounted for movement with the steering wheel is resiliently mounted to allow it to pass beyond the lever stop when the steering wheel is rotated to turn the vehicle.

3. The structure as set for in claim 1 characterized by the fact that said guide means comprises a surface having an indentation therein for the reception of said stop when said lever is in neutral position.

4. The structure as in claim 1 characterized by the fact that both said stops are resiliently mounted, and said guide means comprises a surface having an indentation therein for the reception of said lever carried stop when the lever is in neutral position.

AUGUSTIN MARŠÍK.